United States Patent
Cai et al.

(10) Patent No.: US 8,623,567 B2
(45) Date of Patent: Jan. 7, 2014

(54) METHOD TO DETECT GROSS LOSS IN COOLANT BASED ON CURRENT FEEDBACK FROM THE HIGH TEMPERATURE PUMP

(75) Inventors: Jun Cai, Rochester, NY (US); Seth E. Lerner, Honeoye Falls, NY (US); Loren Devries, Rochester, NY (US); Steven R. Falta, Honeoye Falls, NY (US)

(73) Assignee: GM Global Technology Operations LLC, Detroit, MI (US)

(*) Notice: Subject to any disclaimer, the term of this patent is extended or adjusted under 35 U.S.C. 154(b) by 466 days.

(21) Appl. No.: 13/082,046

(22) Filed: Apr. 7, 2011

(65) Prior Publication Data
US 2012/0255366 A1 Oct. 11, 2012

(51) Int. Cl.
*H01M 8/04* (2006.01)

(52) U.S. Cl.
USPC ............ 429/437; 429/428; 429/430; 429/431

(58) Field of Classification Search
USPC .................. 429/428–431, 437, 450
See application file for complete search history.

(56) References Cited

U.S. PATENT DOCUMENTS

| | | | |
|---|---|---|---|
| 5,118,461 A | 6/1992 | Fukii | |
| 7,654,127 B2* | 2/2010 | Krulevitch et al. | 73/1.16 |
| 7,662,496 B2* | 2/2010 | Fujita et al. | 429/413 |
| 2006/0240297 A1* | 10/2006 | Takeda et al. | 429/22 |
| 2006/0269807 A1* | 11/2006 | Fujita et al. | 429/26 |
| 2007/0065694 A1* | 3/2007 | Maier et al. | 429/24 |
| 2007/0065695 A1* | 3/2007 | Maier et al. | 429/24 |
| 2008/0154187 A1* | 6/2008 | Krulevitch et al. | 604/48 |
| 2010/0300129 A1 | 12/2010 | Bean, Jr. | |
| 2011/0302941 A1* | 12/2011 | Takata | 62/129 |
| 2012/0270325 A1* | 10/2012 | Sperry et al. | 436/43 |
| 2012/0318368 A1* | 12/2012 | Doughty et al. | 137/12 |

FOREIGN PATENT DOCUMENTS

DE 197 37 394 C2 3/1999

* cited by examiner

*Primary Examiner* — Lisa Caputo
*Assistant Examiner* — Jonathan Dunlap
(74) *Attorney, Agent, or Firm* — John A. Miller; Miller IP Group, PLC

(57) ABSTRACT

A system and method for determining a loss of cooling fluid from a thermal sub-system in a fuel cell system. The method includes monitoring current feedback from a high temperature pump that pumps the cooling fluid through a coolant loop. A measured current from the pump is compared to an expected current for the system operating conditions, and if that current is significantly less than what is expected, then it may be as a result of low cooling fluid. If the measured current is less than the expected current for a predetermined period of time, then the system can take mitigating action as a result of a low cooling fluid. Further, if the pump speed is too low to provide an accurate current measurement, then it can be increased if an overflow tank level sensor indicates a low cooling fluid level.

20 Claims, 2 Drawing Sheets

METHOD TO DETECT GROSS LOSS IN COOLANT BASED ON CURRENT FEEDBACK FROM THE HIGH TEMPERATURE PUMP

BACKGROUND OF THE INVENTION

1. Field of the Invention

This invention relates generally to a system and method for detecting a loss of cooling fluid from a thermal sub-system in a fuel cell system and, more particularly, to a system and a method for detecting a loss of cooling fluid from a thermal sub-system in a fuel cell system that uses current feedback from a high temperature pump that pumps the cooling fluid through the thermal sub-system.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack by serial coupling to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

As mentioned above, a fuel cell stack includes cooling fluid flow channels, typically in the stack bipolar plates, that receive a cooling fluid that maintains the operating temperature of the fuel cell at a desired level. The cooling fluid is pumped through the stack and an external coolant loop outside of the stack by a high temperature pump as part of a thermal sub-system, where a radiator typically cools the cooling fluid when it exits the stack. Temperature sensors are typically provided in the coolant loop external to the fuel cell stack to monitor the temperature of the cooling fluid as it exits and enters the stack to maintain a tight control of the stack temperature. The cooling fluid is typically a mixture of water and glycol that provides enhanced heat removal properties and reduces the freeze temperature of the cooling fluid.

If a component fails in the thermal sub-system, it is possible that the cooling fluid could leak from the thermal sub-system. If enough of the cooling fluid does leak from the thermal sub-system there may not be enough cooling fluid to reduce the temperature or maintain the desired temperature of the fuel cell stack, thus causing it to overheat, which could cause damage to various fuel cell system components, such as the fuel cells themselves. Therefore, it is known to employ devices and systems to detect cooling fluid leaks to protect the fuel cell system against overheating and potential component damage.

In one known leak detection design, a dedicated level sensor is employed to detect the level of the cooling fluid in an overflow tank or reservoir that holds the cooling fluid. However, there may be times when the level sensor indicates a low fluid level, but there may not be a significant leak, or no leak at all, and there may still be enough cooling fluid in the thermal sub-system to operate the stack. For example, if the vehicle turns a sharp corner, the fluid in the tank may fall below the level sensor, providing a false indication of a low cooling fluid. Further, for small cooling fluid losses, it may be desirable to only provide a warning indicator and not provide other mitigating actions, such as system shutdown.

SUMMARY OF THE INVENTION

In accordance with the teachings of the present invention, a system and method are disclosed for determining a loss of cooling fluid from a thermal sub-system in a fuel cell system. The method includes monitoring current feedback from a high temperature pump that pumps the cooling fluid through a coolant loop. A measured current from the pump is compared to an expected current for the system operating conditions, and if that current is significantly less than what is expected, then it may be as a result of low cooling fluid. If the measured current is less than the expected current for a predetermined period of time, then the system can take mitigating action as a result of a low cooling fluid. The current comparison can be initiated by a level sensor indicator in the cooling fluid reservoir. Further, if the pump speed is too low to provide an accurate current measurement, then it can be increased if the level sensor indicates a low cooling fluid level.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining a loss of cooling fluid from a thermal sub-system in a fuel cell system is merely exemplary in nature, and is in no way intended to limit the invention or its applications or uses. For example, as mentioned, the method has particular application for determining a loss of cooling fluid from a thermal sub-system. However, as will be appreciated by those skilled in the art, the invention may have application for pumps pumping any fluid.

Figure 1:
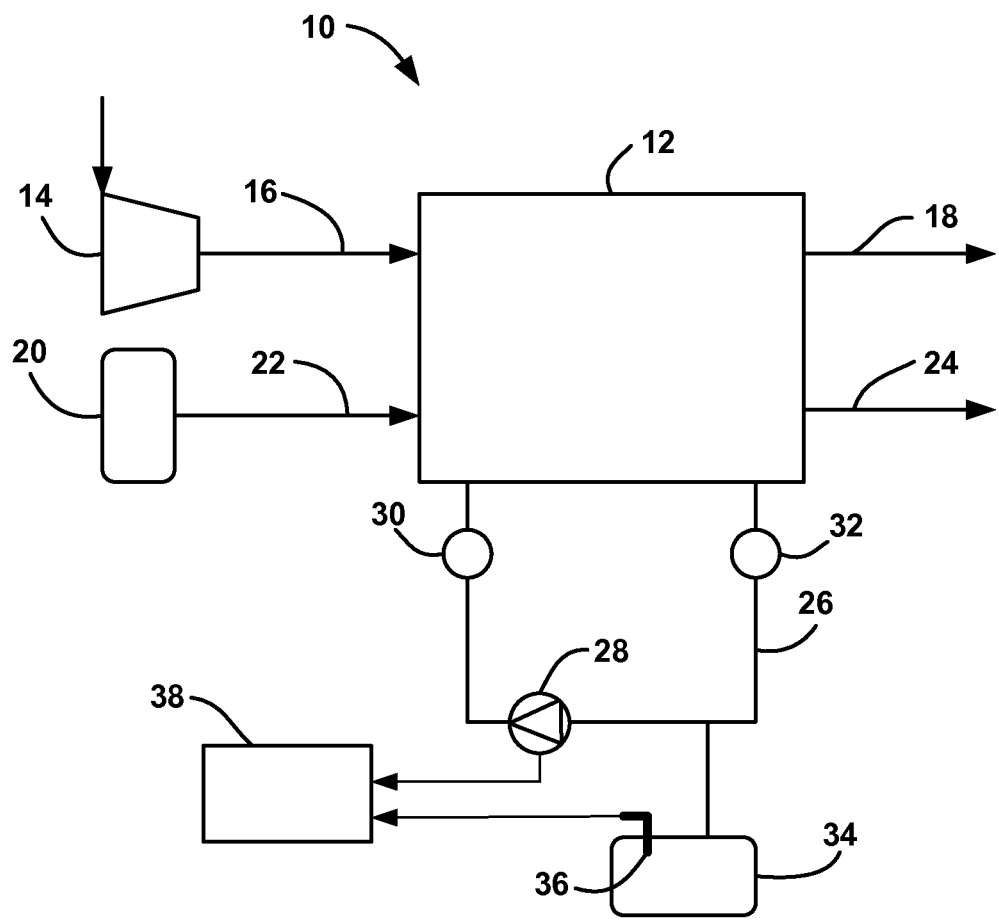
FIG. 1 is a schematic plan view of a fuel cell system including a fuel cell stack and a thermal sub-system.

FIG. 1 is a simplified schematic block diagram of a fuel cell system 10 including a fuel cell stack 12. The fuel cell stack 12 includes a cathode side that receives air from a compressor 14 on a cathode input line 16 and provides a cathode exhaust gas on a cathode exhaust gas line 18. The fuel cell stack 12 also includes an anode side that receives a hydrogen gas from a hydrogen source 20, such as a high pressure tank, on an anode input line 22 and provides an anode exhaust gas on an anode exhaust gas line 24. Typically the anode exhaust and cathode exhaust from a fuel cell stack are combined into a single stack output. The system 10 further includes a thermal sub-system that provides a cooling fluid flow to the fuel cell stack 12. The thermal sub-system includes a high temperature pump 28 that pumps the cooling fluid through a coolant loop 26 external to the fuel cell stack 12 and through the cooling fluid flow channels in the bipolar plates in the fuel cell stack 12. A temperature sensor 30 measures the temperature of the cooling fluid in the coolant loop 26 as it enters the fuel cell stack 12 and a temperature sensor 32 measures the temperature of the cooling fluid in the coolant loop 26 as it exits the fuel cell stack 12. Although not specifically shown, a typical thermal sub-system for a fuel cell system will include a radiator for cooling the cooling fluid from the fuel cell stack 12 and a radiator by-pass line for by-passing the radiator, where the amount of cooling fluid that flows through the radiator and that by-passes the radiator is controlled by a suitable control element and valve to get the desired cooling fluid temperature. The thermal sub-system also includes an overflow tank 34 in fluid communication with the coolant loop 26. A level indicator 36 provides an indication of the level of the cooling fluid within the tank 34.

As well be discussed in detail below, the present invention proposes a method to detect a loss of cooling fluid in the thermal sub-system that utilizes pump current feedback to determine if the pump 28 is generating the expected work required to pump the cooling fluid through the coolant loop 26. In a cooling fluid loss event, for a constant pump speed, the pump current is significantly reduced because the pump 28 is pumping air instead of cooling fluid. Based on this, the estimated pump current and a measured pump current can be compared to determine low cooling fluid. Note that the change in current is relatively low over the full range and pump speed, and the resolution of current feedback has low sensitivity. For this reason, the diagnostic is only reliable at high pump speeds where a large delta current is expected between pumping cooling fluid versus air. If the actual pump current is much less than the expected pump current, it can be inferred that the pump 28 is not pumping significant cooling fluid. A diagnostic could then be set and mitigation actions could be taken to prevent the fuel cell stack 12 from overheating. Caution must be taken from false positive diagnostics to prevent unnecessary remedial actions, such as a reduced power mode, which affects the driver. The present invention proposes one protection against such a false diagnostic by implementing a diagnostic counter. If the counter reaches a predetermined threshold based on the active diagnostic sensing low cooling fluid in a predetermined time frame, the diagnostic is triggered. Alternately, the algorithm could use a predetermined count threshold in a predetermined allotment of time, such as five positive counts in 30 seconds.

The system 10 includes a controller 38 that receives a measured current signal from a sensor in the pump 28 identifying the pump current. The controller 38 also receives a signal from the level indicator 36 indicating when the level of the cooling fluid in the tank 34 is low. The controller 38 compares the measured current to the expected current, and if there is a significant discrepancy for a long enough period of time, will initiate mitigating actions, including providing a warning light to the driver and remedial mitigation actions for the system 10.

Figure 2:
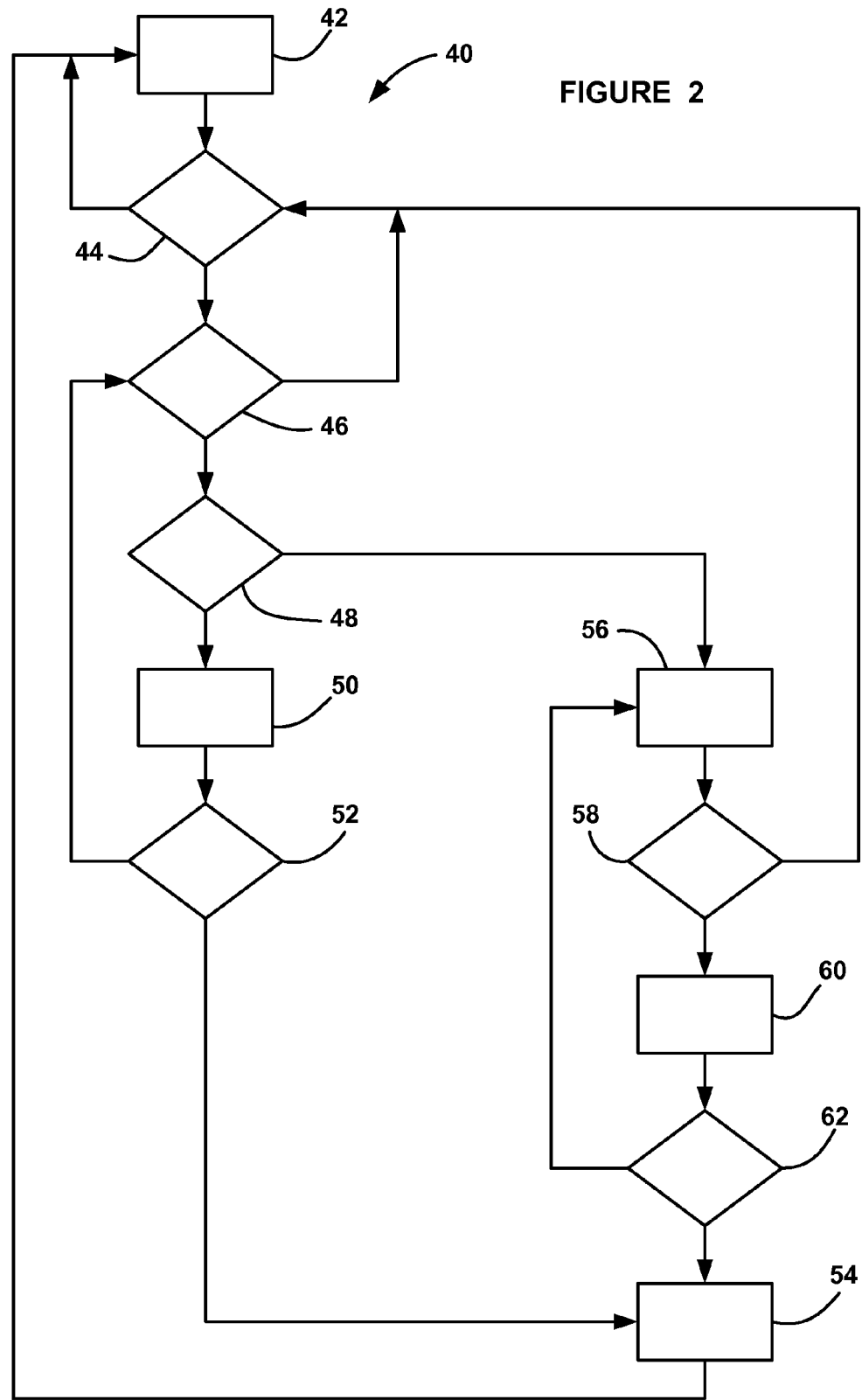
FIG. 2 is a flow chart diagram showing a process for determining a loss of cooling fluid in the thermal sub-system shown in FIG. 1.

FIG. 2 is a flow chart diagram 40 for determining a loss of cooling fluid from the thermal sub-system based on the discussion above. At box 42, the algorithm resets all of the applicable buffers in the controller 38 and sets a counter to zero. At decision diamond 44, the algorithm determines if the tank cooling fluid level sensor 36 indicates that the level of the cooling fluid in the tank 34 is below some level indicating low cooling fluid. If the sensor 36 does not indicate a low level of cooling fluid, then there is adequate cooling fluid in the thermal sub-system, and the algorithm returns to the box 42 to continue to monitor the sensor 36. If the tank cooling fluid level sensor 36 does indicate a low cooling fluid level, then the algorithm compares an estimated or predicted pump current based on system operating conditions to a measured pump current to determine if the measured pump current is some significant predetermined value less than the expected pump current for a predetermined period of time, such as two seconds, at decision diamond 44. If the measured pump current is not less than the expected pump current for that period of time, then the algorithm returns to the decision diamond 42 to monitor the state of the cooling fluid level sensor 36.

If the measured pump current is significantly less than the estimated pump current for the predetermined amount of time at the decision diamond 46, then the cooling fluid level may be quite low. The algorithm then determines if the pump speed is greater than a predetermined speed threshold at decision diamond 48. The algorithm checks the pump speed because the process requires a high enough current draw from the pump 28 to be able to differentiate between a low cooling fluid condition and a normal cooling fluid condition. In other words, if the pump speed is too low, then the current measurement may have significant noise and oscillations, where the difference between the pumped cooling fluid and the pumped air is less than the resolution of the current sensor and could go undetected.

If the pump speed is greater than the predetermined speed threshold at the decision diamond 48, then the algorithm increments a counter at box 50, and determines if the count value of the counter is greater than a predetermined count threshold at decision diamond 52, such as five counts. The algorithm makes sure that the pump current measurement is well below the estimated current for a long enough period of time so as to reduce the chance that the low pump current is for reasons other than a low cooling fluid. In one non-limiting embodiment, each count occurs every 30 seconds so that the total time that the measured current needs to be below the estimated current is about 2½ minutes before the algorithm will take remedial measures. If the count is not greater than the threshold at the decision diamond 52, then the algorithm returns to the decision diamond 46 to compare the currents. If the count is greater than the threshold at the decision diamond 52, then the algorithm sets a cooling fluid loss diagnostic at box 54 to take remedial actions for a low cooling fluid, such as providing a warning light or shutting down the stack 12.

If the pump speed is not greater than the speed threshold at the decision diamond 48, the algorithm commands the pump speed to the threshold, such as 4000 rpm, at box 56. The algorithm then compares the measured current to the estimated current as was done at the decision diamond 46, at decision diamond 58, because even if the measured current was significantly below the expected current for the required period of time at the decision diamond 46, it may have been as a result of a low pump speed. As above, if the measured current is not significantly below the expected current for the required period of time at the decision diamond 58, then the algorithm returns to the decision diamond 44 to monitor the level of the cooling fluid in the tank 34. If the measured current is less than the estimated current for the required period of time at the decision diamond 56, then the algorithm increments the counter at box 60 as was done at the box 50. Likewise, the algorithm then determines whether the count is greater than the threshold at decision diamond 62 as was done at the decision diamond 52, and, if it is not, returns to the box 58 to set the pump speed equal to the pump speed threshold. If the counter has reached the threshold at the decision diamond 64, then the algorithm proceeds to the diagnostics box 54. After the diagnostic is set at the box 54, the algorithm will determine whether the pump speed needs to be reset at the box 42 to the desired pump speed if it has been increased at the box 56. It is noted that the increased pump speed for the low cooling fluid algorithm discussed herein will not significantly affect the stack temperature while the diagnostic is being performed.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining a loss of cooling fluid from a thermal sub-system of a fuel cell system, said method comprising:
    determining an expected current of a pump that pumps the cooling fluid through the thermal sub-system for system operating conditions;
    measuring the current of the pump;
    comparing the expected current of the pump to the measured current of the pump; and
    determining that there may be a loss of the cooling fluid if the measured current is less than the expected current by a predetermined current value.

2. The method according to claim 1 further comprising incrementing a counter if the measured current is less than the expected current by the predetermined current value, and indicating that there is a loss of the cooling fluid if a count value is larger than a predetermined count threshold.

3. The method according to claim 1 further comprising determining if a level of the cooling fluid in an overflow tank is below a predetermined level, and comparing the measured current to the estimated current only if the cooling fluid level is below the predetermined level.

4. The method according to claim 3 wherein determining the level of the cooling fluid includes using a tank level sensor.

5. The method according to claim 1 further comprising determining if the speed of the pump is greater than a predetermined pump speed threshold if the measured current is less than the expected current, and increasing the pump speed to at least the predetermined pump speed threshold if the pump speed is not greater than the pump speed threshold.

6. The method according to claim 5 wherein comparing the expected current of the pump to the measured current of the pump includes also comparing the expected current of the pump to the measured current of the pump after the pump speed has been increased to at least the predetermined pump speed threshold.

7. The method according to claim 5 wherein the predetermined pump speed threshold is about 4000 RPMs.

8. The method according to claim 1 further comprising setting a diagnostic indicating a low cooling fluid.

9. The method according to claim 1 wherein determining that there may be a loss of the cooling fluid includes determining that there may be a loss of cooling fluid if the measured current is less than the expected current by the predetermined current value for a predetermined period of time.

10. The method according to claim 9 wherein the predetermined period of time is about 2 seconds.

11. A method for determining a loss of cooling fluid from a thermal sub-system of a fuel cell system, said method comprising:
    determining an expected current of a pump that pumps the cooling fluid through the thermal sub-system for system operating conditions;
    measuring the current of the pump;
    determining if a level of the cooling fluid in an overflow tank is below a predetermined level;
    comparing the expected current of the pump through the measured current of the pump if the level sensor indicates a low cooling fluid level in the tank;
    determining that there may be a loss of the cooling fluid if the measured current is less than the expected current by a predetermined current value for a predetermined period of time;
    determining if the speed of the pump is greater than a predetermined pump speed threshold if the measured current is less than the expected current for the predetermined period of time;
    increasing the pump speed to at least the predetermined pump speed threshold if the pump speed is not greater than the pump speed threshold;
    again comparing the expected current of the pump to the measured current of the pump; and
    again determining that there may be a loss of the cooling fluid if the measured current is less than the expected current by the predetermined current value for the predetermined period of time.

12. The method according to claim 11 further comprising incrementing a counter if the measured current is less than the expected current by the predetermined current value, and indicating that there is a loss of the cooling fluid if a count value is larger than a predetermined count threshold.

13. The method according to claim 11 wherein determining the level of the cooling fluid includes using a tank level sensor.

14. The method according to claim 11 wherein the predetermined period of time is about 2 seconds.

15. A detection system for determining a loss of cooling fluid from a thermal sub-system of a fuel cell system, said detection system comprising:
    means for determining an expected current of a pump that pumps the cooling fluid through the thermal sub-system for system operating conditions;

means for measuring the current of the pump;

means for comparing the expected current of the pump to the measured current of the pump; and means for determining that there may be a loss of the cooling fluid if the measured current is less than the expected current by a predetermined current value.

16. The detection system according to claim 15 further comprising means for implementing a counter if the measured current is less than the expected current by the predetermined current value, and means for indicating that there is a loss of the cooling fluid if a count value is larger than a predetermined count threshold.

17. The detection system according to claim 15 further comprising means for determining if a level of the cooling fluid in an overflow tank is below a predetermined level, and wherein the means for comparing the measured current to the estimated current only makes the comparison if the cooling fluid level is below the predetermined level.

18. The detection system according to claim 15 further comprising means for determining if the speed of the pump is greater than a predetermined pump speed threshold if the measured current is less than the expected current, and means for increasing the pump speed to at least the predetermined pump speed threshold if the pump speed is not greater than the pump speed threshold.

19. The detection system according to claim 18 wherein the means for comparing the expected current of the pump to the measured current of the pump also compares the expected current of the pump to the measured current of the pump after the means for increasing the pump speed to at least the predetermined pump speed threshold if the pump speed is not greater than the pump speed threshold has increased the pump speed.

20. The detection system according to claim 15 wherein the means for comparing the expected current of the pump to the measured current of the pump determines that there may be a loss of the cooling fluid if the measured current is less than the expected current by the predetermined current value for a predetermined period of time.

* * * * *